US005460146A

United States Patent [19]

Frankenberg

[11] Patent Number: 5,460,146

[45] Date of Patent: Oct. 24, 1995

[54] SOLENOID ACTIVATED EXHAUST GAS RECIRCULATION VALVE

[75] Inventor: Alfred A. Frankenberg, Seymour, Tenn.

[73] Assignee: Robertshaw Controls Company, Richmond, Va.

[21] Appl. No.: 180,661

[22] Filed: Jan. 12, 1994

[51] Int. Cl.[6] .......................... F02M 25/07; F16K 31/02

[52] U.S. Cl. .................... 123/571; 251/129.15; 335/219; 335/255; 335/278

[58] Field of Search .................................. 123/339, 571; 251/129.15; 335/219, 220, 221, 236, 255, 261, 279, 278

[56] References Cited

U.S. PATENT DOCUMENTS

| | | | |
|---|---|---|---|
| 4,442,998 | 4/1984 | Ohyama et al. | 335/255 |
| 4,583,067 | 4/1986 | Hara | 335/261 |
| 4,662,604 | 5/1987 | Cook | 251/129.07 |
| 5,020,505 | 6/1991 | Grey et al. | 123/571 |
| 5,094,218 | 3/1992 | Everingham et al. | 123/571 |
| 5,188,073 | 2/1993 | Ejiri et al. | 251/129.15 |
| 5,232,196 | 8/1993 | Hutchings et al. | 251/129.15 |

OTHER PUBLICATIONS

Exp. Dwg. No. 27235-RC, dated Jul. 12, 1990, entitled "Solenoid EGR Valve".

Ford Motor Company Purchase Order 47-E-E82778, dated Oct. 29, 1990, to Robertshaw Controls Company.

Robertshaw Controls Company Sales Inv. 18795-01, dated Nov. 7, 1990 to Ford Motor Company.

Ford Motor Company Request for Quotation No. 47-E-E85531, dated Dec. 17, 1990 to Robertshaw Controls Company.

Robertshaw Controls Company Sales Invoice 19092-01, dated Jan. 7, 1991 to Ford Motor Company.

*Primary Examiner*—Willis R. Wolfe, Jr.

*Attorney, Agent, or Firm*—Watts, Hoffmann, Fisher & Heinke Co.

[57] ABSTRACT

A valve for combining exhaust gas from an engine combustion chamber with engine intake gases. The valve includes a valve body having a gas inlet and a gas outlet connected by a throughpassage. A flow control member supported by the valve body regulates flow through the valve body throughpassage. A magnetic drive is supported for movement with respect to the valve body and coupled to the flow control member to regulate flow in the throughpassage. An electronically actuated field-generating solenoid moves the magnetic drive member to control flow through the valve body.

11 Claims, 4 Drawing Sheets

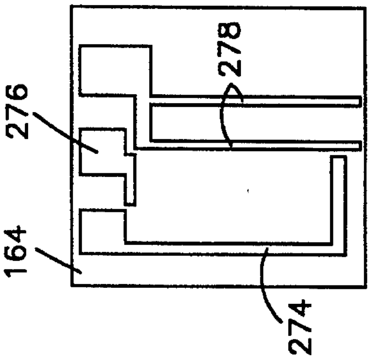
Fig.6
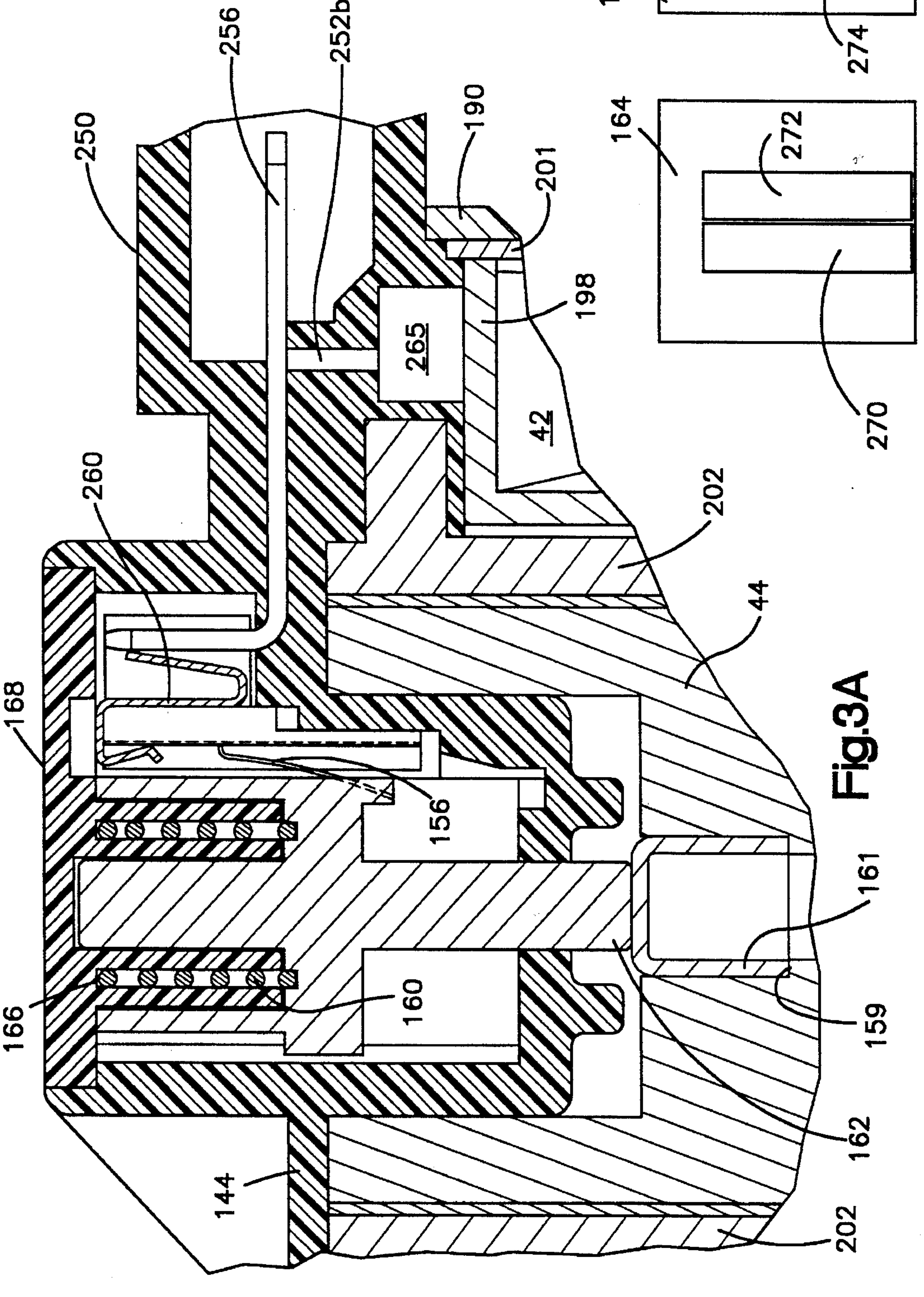
Fig.5
Fig.3A

SOLENOID ACTIVATED EXHAUST GAS RECIRCULATION VALVE

FIELD OF THE INVENTION

The present invention concerns an exhaust gas recirculation valve (EGR valve) for combining exhaust gas from an engine combustion chamber with intake gases before routing a combination of exhaust gas and intake gases to the engine combustion chamber.

BACKGROUND ART

Recirculating exhaust gases back to the intake manifold of an internal combustion engine lowers combustion temperature and reduces the emission of nitrous oxides into the atmosphere. Exhaust gas recirculation (EGR) valves have been used to regulate the proportion of combustion by-products routed back to the intake manifold.

In the prior art, the amount of gas recirculation was controlled in part by means of a vacuum signal that regulated the opening and closing of the EGR valve. Vacuum ports in a throttle valve housing were used to obtain a pressure indication to control opening and closing of the EGR valve. As the engine throttle is first opened, the vacuum ports couple vacuum to the EGR valve, opening the EGR valve and routing combustibles back to the intake manifold. As the throttle valve opens wider, the vacuum supplied to the EGR valve diminishes and the EGR valve closes. When the engine temperature is below a set point temperature, the EGR valve was closed to prevent rough idling of the engine. Adjusting EGR valve setting based on temperature requires a temperature sensor and a means to control the EGR setting based on the sensed temperature.

U.S. Pat. No. 4,662,604 to Cook discloses an EGR valve for an internal combustion engine. A valve housing supports a valve stem that moves back and forth to open and close the EGR valve in response to energization of a solenoid. The present invention concerns an improved electronically actuated EGR valve wherein exhaust gas flow through the valve is adjusted based upon sensed conditions and a control signal is generated based upon those sensed conditions to adjust the valve setting. The valve includes a solenoid assembly that converts the control signal into a linear movement of a flow-regulating member within the valve.

DISCLOSURE OF THE INVENTION

An exhaust gas re-circulation valve assembly constructed in accordance with the present invention combines exhaust gas from an engine combustion chamber with engine intake gases. The assembly includes a valve body having a gas inlet, a gas outlet, and a valve body throughpassage interconnecting the gas inlet with the gas outlet. A flow control member supported by the valve body regulates flow through the valve body throughpassage. A magnetic drive is supported for movement with respect to the valve body and positions the flow control member to control flow from the gas inlet to the gas outlet. A coil assembly has a field-generating coil that sets up a magnetic field for positioning the magnetic drive. The coil assembly includes first and second magnetic field-defining portions spaced from the magnetic drive by a gap which allows relative movement of the magnetic drive with respect m the coil assembly while magnetically coupling the drive means and coil assembly.

The coil assembly most preferably has a current-carrying coil having multiple windings wound concentrically about a travel path for the magnetic drive. The magnetic drive has a cylindrical outer surface disrupted by an annular groove that helps control the magnetic coupling between the magnetic field-defining members and the drive member. The magnetic coupling is also controlled by the shape of the first and second magnetic field-defining members. More specifically, a taper on one of the magnetic field-defining members enhances magnetic coupling as a degree of overlap between the drive member and the field-defining member increases. This increased coupling balances a restoring force acting on the drive member that increases with drive member displacement.

BRIEF DESCRIPTION OF THE DRAWINGS

FIG. 3A is an enlarged section view of a movement sensor for monitoring movement of a valve stem;

FIGS. 5 and 6 are plan views of a substrate that forms a part of the movement sensor.

DETAILED DESCRIPTION OF THE DRAWINGS

Figure 1:
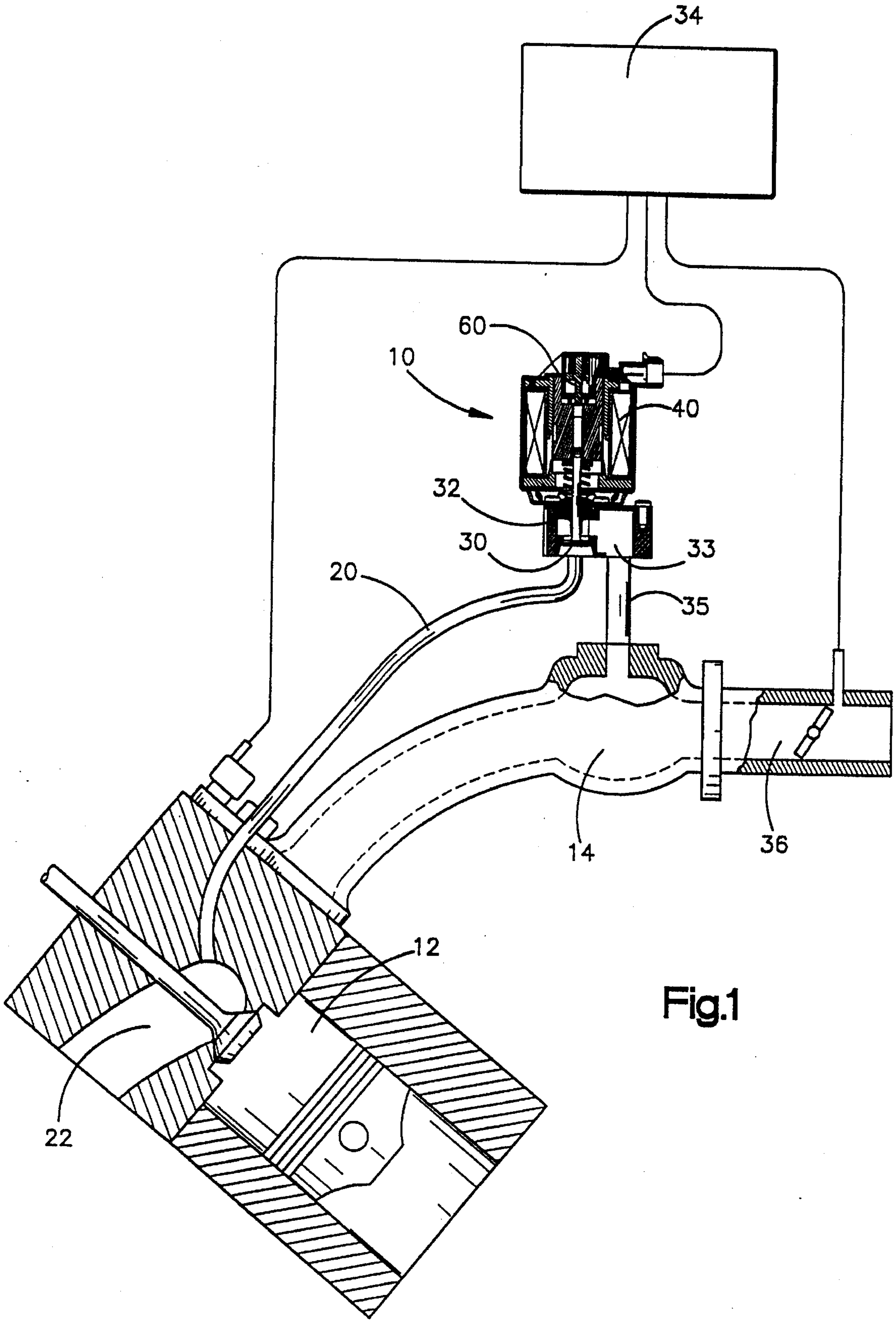
FIG. 1 is a schematic showing a combustion chamber and a fluid conduction path for routing combustibles from the exhaust chamber to the EGR valve of FIG. 1.

The drawings illustrate a valve assembly 10 for routing exhaust gases containing combustion by-products from an engine combustion chamber 12 to a region 14 upstream of the combustion chamber 12 where the exhaust gases are combined with combustibles before they enter the combustion chamber 12. A recirculation pipe 20 routes gas from an exhaust manifold 22 to the valve assembly 10. A valve flow control member 30 moves back and forth with respect to a valve body 32 (FIG. 3) to regulate the volume of exhaust gas that flows through a valve body passageway 33 to a pipe 35 which routes the exhaust gases back to the combustion chamber via a passageway leading to the combustion chamber 12.

Flow through the valve assembly 10 is electronically controlled by a computer or programmable controller 34 that monitors engine conditions such as temperature of the combustion chamber, engine speed and load, and pressure of gases entering an intake manifold 36. In response to these sensed conditions, the computer 34 determines a desired volume of exhaust gas recirculation and an appropriate valve setting to achieve the desired volume of flow. A pulse width modulated output signal generated by the computer 34 activates an EGR valve solenoid 40 to adjust the position of the flow control member 30 and provide the desired volume of exhaust gas flow through the passageway 33.

The pulse width modulated signal from the computer 34 energizes a solenoid coil 42 (FIG. 3) which sets up a magnetic field for moving a plunger 44 to a desired position. The position of the plunger 44 dictates the position of the flow control member 30 within the passageway 33. The computer 34 monitors the position of the plunger 44 by means of a position sensor 60 that provides a feedback output signal as the magnetically permeable plunger 44 moves in response to solenoid energization. The feedback signal from the sensor 60 is directly related to the plunger position so that the computer 34 can adjust the pulse width modulation duty cycle to achieve a desired plunger position.

The flow control member 30 includes a valve head 114 which moves back and forth with respect to the valve body 32 in the passageway 33 to control flow through the body. The valve head 114 is connected to an elongated valve shaft or stem 116 which extends away from the valve body through a stationary guide 120. In its fully closed position, the valve head rests against a valve seat 124. A tapered throat 126 characterizes the flow vs. position of the valve.

The solenoid winding 42 has a large number of turns wound circumferentially around and along a length of the plunger 44. The plunger 44 is a cold rolled steel annulus supported within a thin wall metal casing or tube 140 closed at one end by a molded plastic housing 144 that supports the sensor 60. A compressed spring 142 biases the plunger 44 toward the position shown in FIG. 3 which closes the passageway to gas flow.

A metal retainer 150 is crimped onto one end of the shaft 116 and extends into a stepped center passageway 152 in the plunger 44. The retainer 150 has a cylindrical center portion 153 that fits over the end of the shaft. When this center section is deformed by crimping, it is forced into a groove 155 in the shaft. The retainer 150 defines a cup-like seat for the compressed spring 142 that biases the valve head 114 toward a closed position against the seat 124. To open the valve and increase the volume of gas flowing from the inlet to the outlet, the plunger 44 is moved against the biasing action of the spring 142. This movement applies a force to the retainer 150 to move the elongated shaft 116 and attached valve head 114 as the spring 142 compresses. The valve head 114 is pushed away from the position shown in FIG. 3 to allow a controlled volume of fluid to flow between the head 114 and the valve seat 124.

Controlled energization of the winding 42 is performed by regulating an on and off period of a pulse width modulated signal applied to the winding 42 that results in a controlled average coil current. The amount of fluid flow from the valve inlet to the outlet is adjusted by increasing or decreasing the pulse "on" time while maintaining a nominal frequency of 128 hertz. The self-inductance of the coil winding 42 and the mechanical inertia of the plunger 44 assure the coil winding carries an average current related to this pulse "on" time.

The sensor 60 includes two electrically interconnected conductive wiper elements 156 attached to a follower 158 that moves back and forth in the housing 144 as the plunger 44 moves. The follower 158 is biased against the plunger 44 by a compression spring 160 and has a shaft 162 that extends through an opening in the plastic housing 144 to contact a wire clip 161 that allows air flow in the center passageway 152 and is seated within a well 159 (FIG. 3A) in the plunger 44. The spring 160 fits into an annular groove 166 in a plastic cover 168 that fits within the housing 144. The sensor 60 is assembled by inserting the follower into the housing 144, placing the cover 168 over the follower and ultrasonically welding the cover 168 and housing 144 together.

The compressed spring 160 causes the follower 158 to move with the plunger 44 so that the wiper elements 156 moves across two parallel resistive surfaces supported by a substrate 164 fixed within the housing 144. By monitoring an electric potential of the wiper elements, the controller 34 monitors the position of the plunger 44. Only one of the two side-by-side wiper elements is visible in the section view of

FIG. 3.

The valve body 32 supports the valve stem guide 120 and a heat shield 182 having an opening through which the stem 116 extends. The heat shield 182 includes a skirt 184 that borders the flow passageway 33 in the valve body 32. The guide 120 contacts the shield 182 and has an annular ridge 185 co-planar with a surface 186 of the valve body. A gasket 187 having a cutout to accommodate the guide 120 contacts the ridge 185 and inhibits gas in the passageway 33 from exiting the valve body where the guide 120 engages the valve body. A heat shield 190 for the solenoid is secured to the valve body 32 by means of connectors 192 which extend through the shield 190 into threaded openings in a removable valve body plate 191.

After the heat shield 190 is attached to the valve body, a metal spring cup 194 with an opening 195 in its center is placed over the elongated valve shaft 116. A depression 196 in the spring cup 194 forms a seat for one end of the compression spring 142. This spring is placed over the shaft and seated into the depression 196 before the retainer 150 is crimped onto the stem 116 to trap the spring in place.

The coil winding 42 is supported within a bobbin 198 and is encapsulated in a plastic coating 199 that is applied around the outer surface of the coil winding 42. Three magnetic pole pieces 200–202 having high magnetic permeability such as steel border the solenoid coil winding 42. A first outer magnetic piece 200 fits into the heat shield 190 and rests on a lip 212 that extends circumferentially around the plate 194. A second magnetic pole piece 201 contacts the pole piece 200 and fits between the bobbin 198 and the shield 190. The other pole piece 202 completes a magnetic circuit that surrounds the plunger 44. The four magnetic pieces 200–202, the plunger 44 and the shield 190 define a magnetic circuit for magnetic fields setup by controller energization of the solenoid coil 42.

Figure 3:
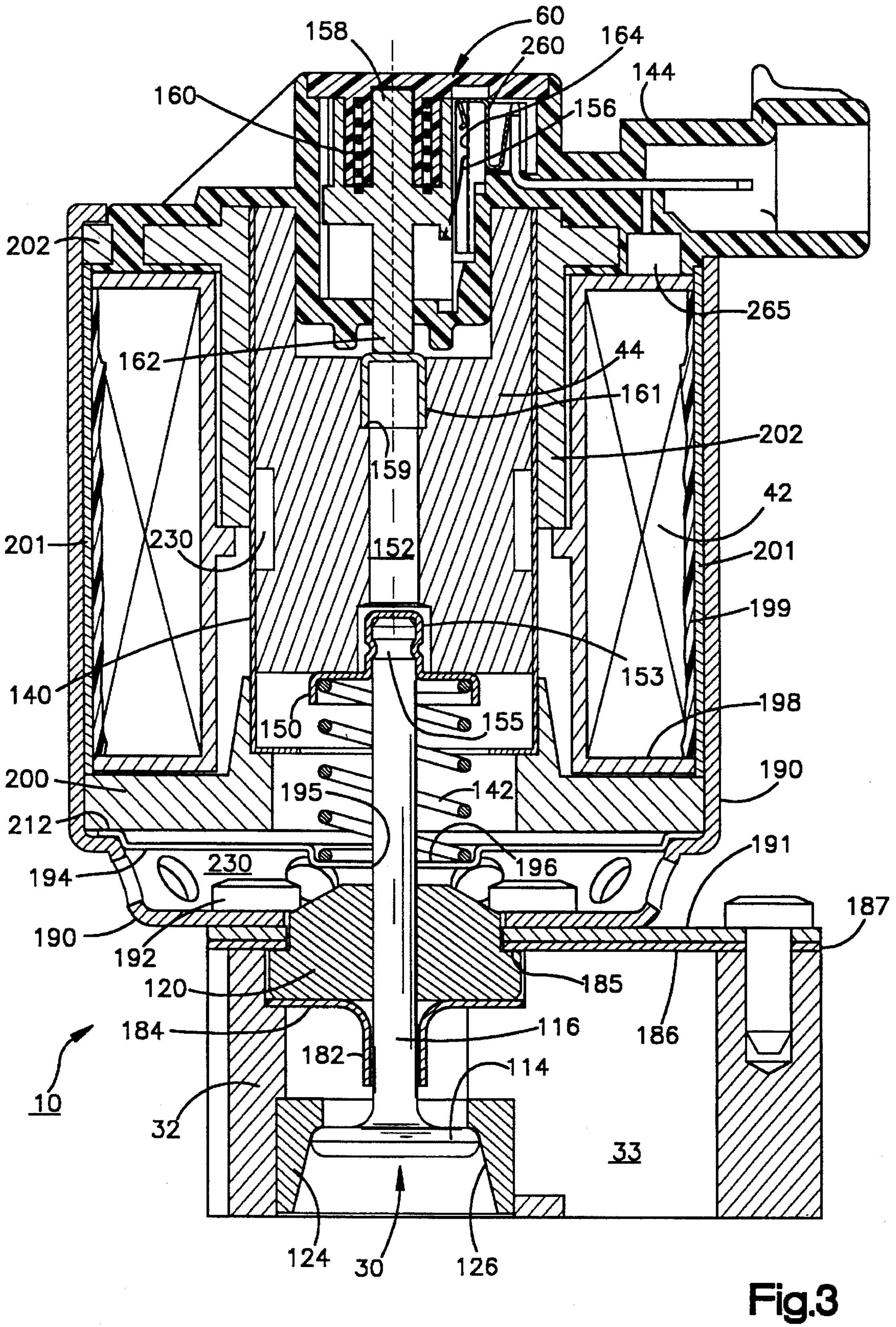
FIG. 3 is a section view of the FIG. 2 valve assembly as seen from the plane 3—3 of FIG. 2.

As seen in FIG. 3, arrows 220 indicate the path for the magnetic circuit which travels through the pole pieces 200–202 into and out of the plunger 44. The magnetic potential difference across each element of the path is relatively independent of the position of the plunger 44, except for the magnetic potential difference between the plunger 44 and the pole piece 200.

The magnetic field set up by the combination of the pole pieces 200–202, the plunger 44 and the coil 42 is most easily analyzed by consideration of the changes in magnetic energy as the plunger 44 moves. The force exerted on the plunger 44 by the magnetic field is related to the change in magnetic energy of the system as a function of position. The plunger 44 reaches a stable position when this force is balanced by an equal and opposite force of the spring 142 tending to return the valve head 114 to the valve seat 124.

When the valve head 114 is seated as shown in FIG. 3, the magnetic circuit extends across a significant air gap since the plunger 44 does not extend into a region surrounded by the pole piece 200. As current through the solenoid coil 42 increases, magnetic forces on the plunger 44 move the plunger against the force of the spring 142. As the plunger 44 moves, a magnetic potential difference across the gap between the plunger 44 and the pole piece 200 changes since the plunger 44 enters the region bounded by the pole piece 200.

Figure 4:
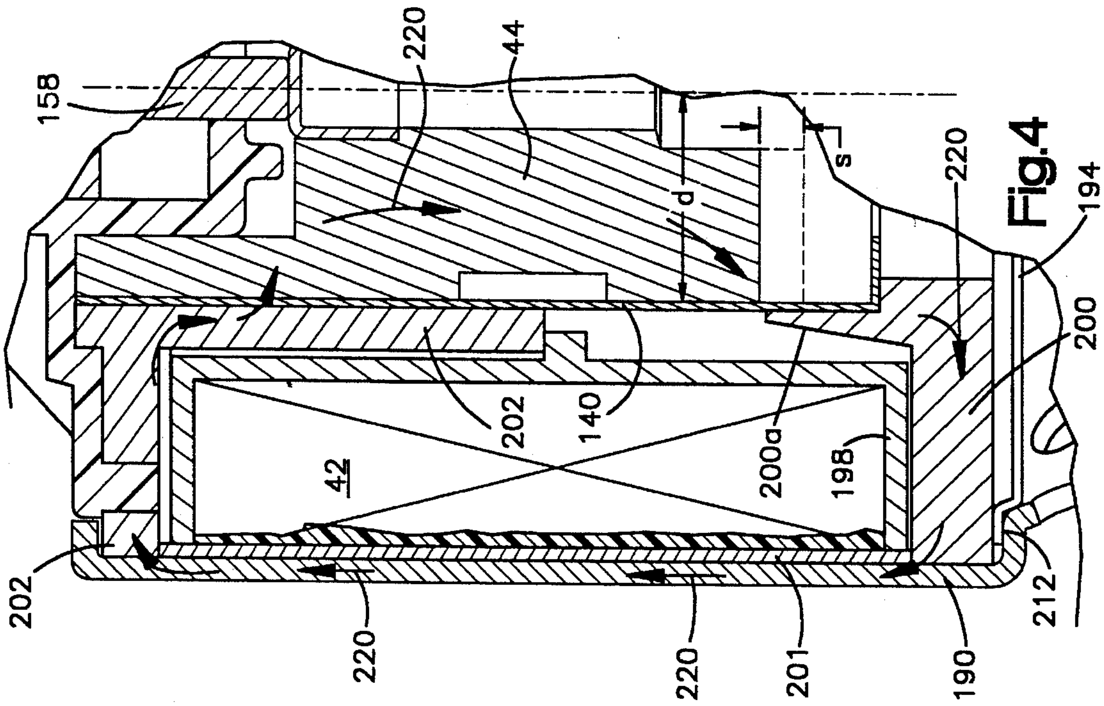
FIG. 4 is an enlarged view of the FIG. 3 section view to show magnetic coupling between a plunger and a magnetic pole piece.
Figure 2:
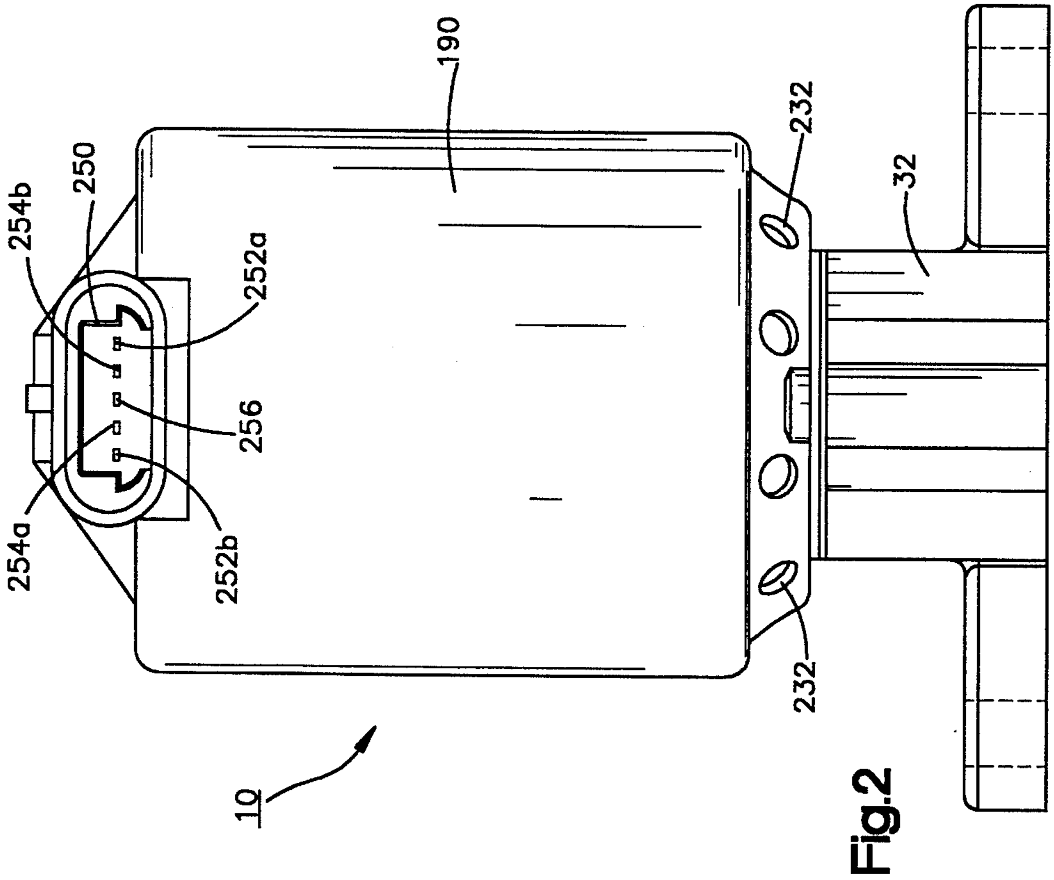
FIG. 2 is a plan view of an exhaust gas recirculating (EGR) valve assembly constructed in accordance with the invention.

A magnetic permeance of the gap between the plunger 44 and pole piece 200 is proportional to a surface area A of the amount of overlap divided by the width r of the gap. In the disclosed design, r is invariant and approximately the thickness of the tube 140. In equation form, this is:

Permeance $(P) \propto A/r$ or $$2\pi\frac{d\cdot s}{r},$$

where s is the amount of plunger overlap with the pole piece 200 and d is the plunger radius (see FIG. 4).

The force generated on the plunger 44 is proportional to the difference in magnetic energy between different plunger positions. For the coil/plunger geometry shown in FIG. 3, this is the magnetic potential drop across the gap between the plunger and the pole piece raised to the power of 2 multiplied by the change of permeance with respect to movement of the plunger 44. In equation form, this is:

$$\text{Force} \propto (\text{mag. potential})^2\frac{dP}{ds}$$

A gap or groove 230 extends circumferentially around the outer surface of the plunger. The gap 230 intercepts field lines and keeps the magnetic permeance across the gap between the plunger 44 and the pole piece 202 constant with respect to plunger position. This is because the area of magnetic material overlap of the pole piece 202 is constant and hence the derivative of the permeance with respect to stroke is zero in this region, making the force exerted on this end of the plunger 44 due to changes in magnetic coupling zero.

As the other end of the plunger 44 moves with respect to the tapered pole piece 200, however, the magnetic force acting on the plunger 44 changes as a function of the position of the plunger 44. Since the permeance is approximately linearly related to plunger overlap s (avoiding ringing affects), the derivative with respect to overlap is constant. This means the magnetic potential term in the force relation dictates how the force varies with plunger position.

The shape of a taper 200*a* on the pole piece 200 in combination with a changing duty cycle in the coil 42 controls the magnetic potential term in the force relation. The response of the plunger 44 to coil energization is controlled by the shape of this taper to provide a linear relation between force acting on the plunger and plunger position. More particularly, as the spring 142 is compressed, the return force exerted on the plunger 44 varies in a generally linear fashion due to the linear tapered section of the pole piece 200.

The construction of the valve assembly 10 allows high temperature exhaust gases to be routed through the valve body 32. The heat from the exhaust gas is isolated as much as possible from the coil 42 to maintain the coil 42 below 400° F. This insulation prevents the force versus pulse width modulation profile from being dependent on magnetic permeability changes due to changes in temperature. An airspace 230 prevents heat from the exhaust gas from being conducted directly to the coil 42. The only heat conducted to the coil passes through the shield 190 or the shaft 116. Holes 232 (FIG. 3) in the shield 190 allow air to flow through the airspace 230 and remove much of the heat. The spring cup 194 also acts as a heat shield to stop radiation and convection heat transfer from the hot valve body 32 to the coil 42.

A pressure differential across the seat 124 acts to close the passageway 33, but allows a low current to open the valve. Normally, a reverse acting valve with spring loading can be unstable at closing. The shape of the seat 124 and the large mass of the plunger 44 inhibit unstable operation at valve closure. Also, the center passage 152 in the plunger 44 acts as a damper to keep oscillations from occurring. Because the plunger is not attached to the shaft, binding of the stem due to misalignment of the stem and plunger does not occur.

Electric signals that energize the coil 42 and monitor plunger movement are routed by a cable having female contacts that mate with male contacts of a housing connector 250. Two contacts 252*a*, 252*b* are coupled to opposite ends of the winding 42 and apply a pulse width modulated signal to the winding as dictated by the computer 34. Two other contacts 254*a*, 254*b* energize opposite ends of one resistive layer 272. The final contact 256 is electrically coupled to the wipers 156 and provides a feedback signal corresponding to the position of the plunger 44.

As seen most clearly in FIG. 3A, the contacts extend from the region of the connector 250 into an interior of the molded plastic housing 144. The two contacts 252*a*, 252*b* extend to a cavity 265 near the coil 42 where they are connected to opposite ends of the coil. The contacts 254*a*, 254*b*, 256 extend to the region of a clip 260 that holds the substrate 164 in place within the housing.

The substrate 164 supports two resistive patterns 270, 272 and three conductor patterns 274, 276, 278 on opposite sides. The two conductor patterns 274, 276 are electrically connected to the contacts 254*a*, 254*b* and are electrically connected through the substrate to opposite ends of the resistive layer 272. The conductor 278 has two elongated extensions that extend through the substrate 164 to contact the resistive layer 270. The conductor 278 is electrically coupled to the contact 256 so that, as the two electrically connected wipers move up and down as the plunger 44 moves a part of the potential is tapped off the resistive layer 272 and connected by the layer 270 to the conductor 278 and the output contact 256.

The present invention has been described with a degree of particularity, but it is the intent that the invention include all variations from the disclosed design falling within the spirit or scope of the appended claims.

I claim:

1. A method for routing exhaust gases from a combustion chamber and combining the exhaust gases with intake gases upstream of the combustion chamber comprising the steps of:

a) providing an exhaust gas flow passageway in a valve body for routing combustion exhaust gases through the valve body to a region upstream of the combustion chamber;

b) mounting a valve head for movement within the flow passageway by connecting the valve head to a valve stem that extends from the passageway through a wall of said valve body;

c) coupling the valve stem to a magnetic plunger mounted for movement along a travel path within a housing that allows air to contact a portion of the valve stem between the valve body and the plunger; and d) establishing a magnetic field in a region of the magnetic member that positions the magnetic plunger and valve head to regulate exhaust gas flow through the flow passageway;

e) said establishing step including the positioning of first and second annular magnetic pole pieces next to the travel path of said magnetic plunger to provide a controlled force versus position profile on the magnetic plunger controlled by a magnetic energy that varies with the amount of overlap of the magnetic pole pieces and the magnetic plunger along the travel path.

2. An exhaust gas re-circulation valve assembly for combining exhaust gas from an engine combustion chamber with engine intake gases comprising:

a) a valve body having a gas inlet, a gas outlet, and a valve body throughpassage interconnecting the gas inlet with the gas outlet;

b) a valve head connected to a valve stem that extends through a wall of the valve body and is supported by the valve body for movement to position the valve head within the valve body throughpassage;

c) a magnetic plunger coupled to the valve stem to position the valve head and control flow from the gas inlet to the gas outlet;

d) a coil assembly having a field-generating coil that sets up a magnetic field for positioning the magnetic plunger, said coil assembly including magnetic means having first and second magnetic portions circumferentially spaced from the magnetic plunger by a gap which allows relative movement of the magnetic plunger with respect to the coil assembly while magnetically coupling the plunger and coil assembly; and e) a housing connected to the valve body for supporting the plunger and the coil assembly and including a wall that defines an air space surrounding a portion of the valve stem between the valve body and the plunger to inhibit heat transfer from the valve body to the coil assembly.

3. An exhaust gas re-circulation valve assembly for combining exhaust gas from an engine combustion chamber with engine intake gases comprising:

a) a valve body having a gas inlet, a gas outlet, and a valve body throughpassage interconnecting the gas inlet with the gas outlet;

b) a valve head positioned within the valve body throughpassage and a valve stem connected to the valve head supported by the valve body for movement with respect to the valve body to regulate gas flow through the valve body throughpassage;

c) a generally cylindrical magnetic plunger coupled to the elongated valve stem for positioning the valve head within the valve body throughpassage;

d) a tube that surrounds the magnetic plunger and constrains the plunger to movement along a travel path as the plunger positions the valve head within the throughpassage; and e) a field-generating coil assembly that sets up a magnetic field for moving the magnetic plunger, said coil assembly including a current-carrying coil that surrounds the plunger and first and second magnetic field-defining members spaced from each other along the travel path of the magnetic plunger and spaced from the plunger by the tube to allow relative movement of the magnetic plunger with respect to the valve body, said first and second magnetic field-defining members providing a magnetic coupling through the tube between the magnetic plunger and the coil assembly which produces a controlled profile of force on the magnetic plunger as a function of position of the magnetic plunger along the travel path.

4. The exhaust gas re-circulation valve of claim 3 where the current carrying coil has multiple windings wound circumferentially around the magnetic plunger and wherein the magnetic plunger has a generally cylindrical outer surface disrupted by an annular field disrupter that intercepts the magnetic field created by the coil windings to control a magnetic coupling across the gap between one of the first and second magnetic field-defining members and the magnetic plunger.

5. The valve assembly of claim 3 additionally comprising a housing that supports the coil assembly and defines a heat shield for separating the coil assembly and valve body by an air gap for inhibiting heat transfer from gases passing through the valve body to the coil assembly.

6. The exhaust gas recirculation valve assembly of claim 3 additionally comprising a spring coaxial with the valve stem tending to move the valve head to reduce gas flow through the valve body throughpassage and decreasing the magnetic coupling between one of said first and second magnetic field defining members and the magnetic plunger.

7. The valve assembly of claim 6 wherein the spring provides a return force which is overcome by an increased magnetic coupling as the drive means moves the flow control means to increase gas flow through the valve assembly passageway.

8. An exhaust gas re-circulation valve assembly for combining exhaust gases from an engine combustion chamber with engine intake gases comprising:

a) a valve body having a gas inlet and a gas outlet interconnected by a valve body throughpassage defining a valve seat;

b) a valve head positioned within the valve body throughpassage and a valve stem connected to the valve head supported by the valve body for moving the valve head with respect to the valve body and thereby regulate gas flow through the valve body throughpassage;

c) a magnetic plunger for positioning the valve head within the valve body throughpassage;

d) a biasing member for exerting a restoring force against both the magnetic plunger and valve stem to position the valve head against the valve seat;

e) a field-generating coil assembly that extends along a length of the magnetic plunger and supports the magnetic plunger for movement along a travel path, said coil assembly including:

i) a current-carrying coil that extends along at least a portion of the travel path of the plunger and sets up a magnetic field for moving the magnetic plunger by controlled energization of the coil by an external power source; and ii) first and second annular magnetic field-defining members spaced from each other co-axially along the travel path of the magnetic plunger and spaced from the magnetic plunger to allow movement of the magnetic plunger;

iii) said first and second magnetic field-defining members providing an increased magnetic coupling between the magnetic plunger and the coil assembly to produce an increasing force on the magnetic plunger as the magnetic plunger moves the valve head away from the valve seat against the restoring force of the biasing member wherein one of said first and second magnetic field defining members comprises a tapered annulus that increases magnetic coupling proportional to an amount the magnetic plunger and said tapered annulus overlap.

9. The valve assembly of claim 8 additionally comprising a housing that supports the coil assembly and defines a heat shield for separating the coil assembly and valve body by an air gap for inhibiting heat transfer from gases passing through the valve body to the coil assembly.

10. The valve assembly of claim 9 further comprising a retainer attached to the valve stem and wherein the biasing member comprises a spring trapped between the retainer and the housing to bias the valve stem toward the magnetic plunger and provide simultaneous movement of the magnetic member and the valve stem.

11. The valve assembly of claim 8 wherein the valve seat comprises a tapered throat narrowest at a region the valvehead contacts the seat to define a position vs flow of gas flowing through the valve body.

* * * * *